United States Patent
Desrosiers et al.

(10) Patent No.: US 8,281,478 B2
(45) Date of Patent: Oct. 9, 2012

(54) IN-SITU MOLDED FASTENER

(75) Inventors: Norman Bruce Desrosiers, Oxford, NC (US); Dean Fredrick Herring, Youngsville, NC (US)

(73) Assignee: International Business Machines Corporation, Armonk, NY (US)

(*) Notice: Subject to any disclaimer, the term of this patent is extended or adjusted under 35 U.S.C. 154(b) by 1124 days.

(21) Appl. No.: 12/171,868

(22) Filed: Jul. 11, 2008

(65) Prior Publication Data
US 2010/0009113 A1    Jan. 14, 2010

(51) Int. Cl.
  *B21B 1/46* (2006.01)
  *B29C 45/14* (2006.01)
(52) U.S. Cl. .......................... 29/527.1; 428/99
(58) Field of Classification Search ............... 29/527.1, 29/527.2, 527.3, 428, 458, 460, 465, 238; 428/99; 425/111; 264/154
See application file for complete search history.

(56) References Cited

U.S. PATENT DOCUMENTS

| 4,238,446 | A | 12/1980 | Tanaka |
| 4,370,372 | A | 1/1983 | Higgins et al. |
| 4,919,020 | A | 4/1990 | Huebschen |
| 5,265,994 | A | 11/1993 | Johnston et al. |
| 6,979,163 | B2 | 12/2005 | Brletich et al. |
| 2002/0105237 | A1* | 8/2002 | Itoh et al. ................ 310/12 |
| 2007/0224014 | A1 | 9/2007 | Stinson |

FOREIGN PATENT DOCUMENTS

| JP | 2001343007 | 12/2001 |
| JP | 2005088218 | * 4/2005 |

OTHER PUBLICATIONS

Pennengineering, Pem SpotFast Fasteners Bulletin, Revised 1207, www.pemnet.com, 2006, 4 pages.

* cited by examiner

*Primary Examiner* — John C Hong
(74) *Attorney, Agent, or Firm* — Cynthia G. Seal; Jeffrey L. Streets

(57) ABSTRACT

A method forming a fastener in-situ for fastening two parts at abutting surfaces. A through hole may be formed on each of the first and second parts such that the diameters of the through holes at the abutting surfaces are smaller than the diameters at opposing surfaces. The first and second parts are abutted with the through hole on the first part in fluid communication with the through hole on the second part. A flowable and hardenable material is injected into the first through hole while closing flow out of the second through hole. The flowable and hardenable material contained within the through holes is allowed to harden, thus forming a unitary fastener that fastens the parts.

10 Claims, 2 Drawing Sheets

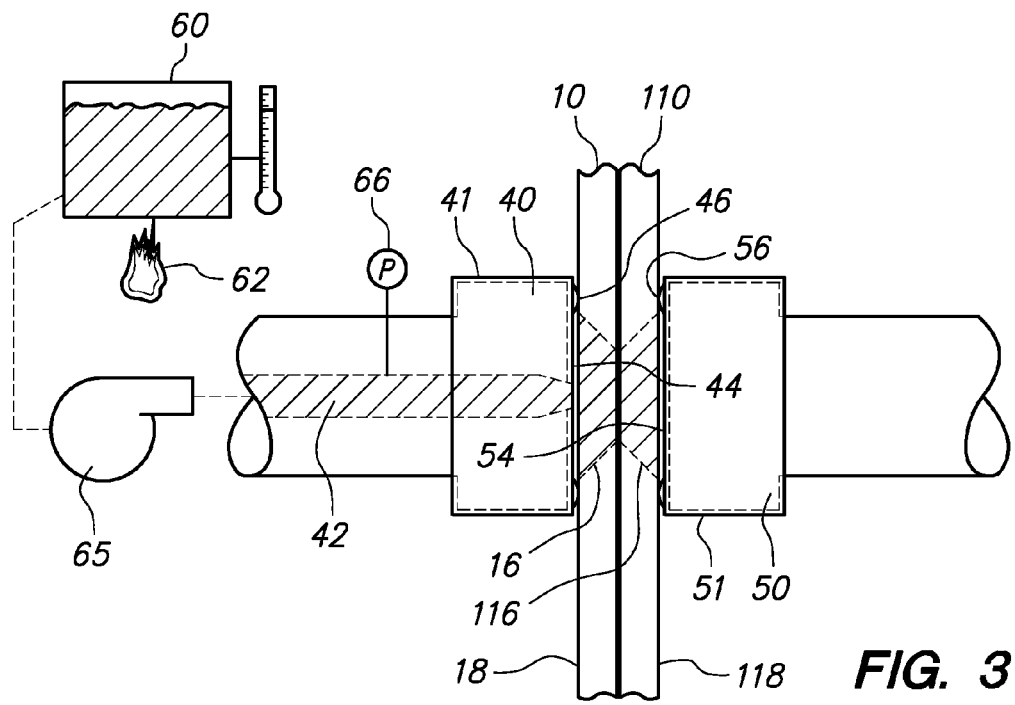
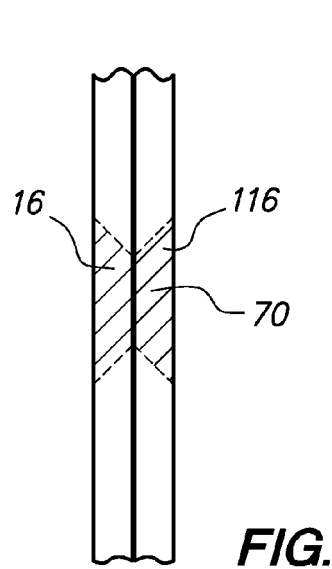
FIG. 4
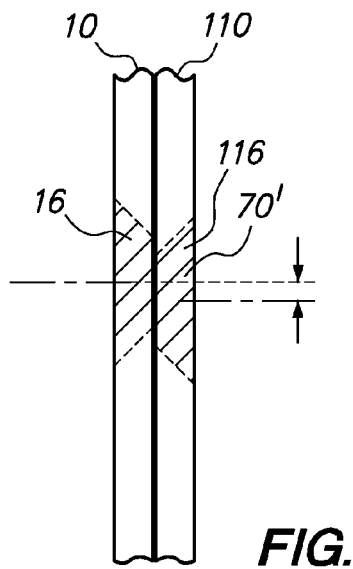
FIG. 5
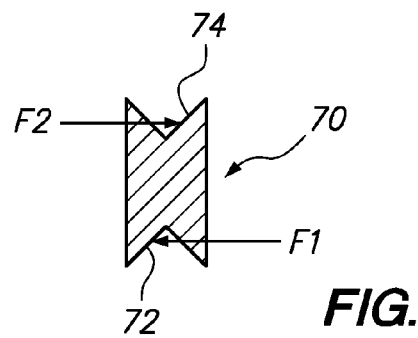
FIG. 4A

IN-SITU MOLDED FASTENER

BACKGROUND OF THE INVENTION

1. Field of the Invention

The present invention relates to fasteners, such as for fastening sheet-metal parts.

2. Background of the Related Art

Sheet metal parts are among the variety of parts that can be joined using fasteners. Sheet metal parts are commonly found in computer equipment such as computer chassis. A variety of mechanical fasteners and methods of fastening parts are known in the art. Examples of fasteners include rivets, nuts-and-bolts, and screws. Fastening methods also include welding or epoxy bonding. A variety of alignment features and methods of aligning parts to be assembled are also known in the art. An example of an alignment feature is a pin. Many fasteners can also be used as an alignment feature. For example, rivets, bolts, screws, and other fasteners are commonly used to fix the location of one part with respect to another part.

A variety of trade-offs and difficulties arise in the assembly of parts. For example, manufacturing tolerances in multi-part assemblies can "stack up," so that fasteners or alignment/locator features do not line up as intended. Depending on the fastener used, tolerance stack-up can cause manufacturing difficulties. Many fasteners and fastening methods create a permanent joint, which, despite their associated benefits, may also have some disadvantages. For example, parts may be welded or bonded using epoxy to produce a very strong joint, with a potential drawback that the parts cannot be easily separated without damaging them. Another manufacturing issue is that tools and automated machinery are frequently required to fasten parts. The complexity of tools or machinery used to assemble parts is a factor in the overall cost and feasibility of manufacturing an assembly. Another problem with conventional fastening methods is that fasteners may undesirably protrude from a surface of a part.

BRIEF SUMMARY OF THE INVENTION

One embodiment of the present invention provides a method of fastening two parts. The two parts to be fastened are selected, and a through hole is formed on each part between a first surface and an opposing second surface such that a dimension of each through hole at the first surface is larger than a dimension of the through hole at the opposing second surface. The two parts are abutted at the respective second surfaces with the through holes in fluid communication with each other. A flowable and hardenable material is injected into the through holes of the two parts while preventing flow of the material out of the through holes. The flowable and hardenable material is allowed to harden within the through holes. Another embodiment provides a fastener formed in-situ by this method.

Another embodiment provides a system for fastening parts. A through hole forming device is configured for selectively forming variable width through holes on each two parts to be fastened from a first surface to an opposing second surface, such that the width of each through hole on the first surface is larger than the width of the through hole at the opposing second surface. Opposing first and second platens are configured for selectively urging the parts into engagement while two through holes are in fluid communication with each other. A flowable material injection system includes a source of flowable and hardenable material, a flow passage through the first platen and in fluid communication with the through hole on the part engaged by the first platen, and a pressurizing mechanism for urging the flowable and hardenable material through the flow passage and into the first and second through holes between the first and second platens under pressure. The flowable material injection system selectively maintains pressure while the flowable and hardenable material hardens within the through holes.

BRIEF DESCRIPTION OF THE SEVERAL VIEWS OF THE DRAWINGS

FIG. 3 is a schematic side view of the first and second parts with a fastener being formed in-situ in the through holes.

FIG. 4 is a schematic side view of the parts as retained by the fastener.

FIG. 4A (inset) is a side view of the fastener with the fastened parts hidden from view.

FIG. 5 is a schematic side view of the parts fastened by a fastener formed in-situ while the through holes were misaligned.

DETAILED DESCRIPTION OF THE INVENTION

Embodiments of the present invention include systems and methods of fastening two parts by forming an in-situ fastener. For example, in one embodiment, a chamfered through hole is formed on each of a first and second part to be joined. The parts are abutted with the through holes in fluid communication with one another, and with the chamfers facing away, such that the dimensions of the through holes at the abutting surfaces are smaller than the dimensions at opposing surfaces of the abutted first and second parts. A flowable and hardenable material ("adhesive material"), such as a low-melting-point alloy or thermoplastic polymer, is injected while in a flowable state into the first and second through holes under pressure, between impinging platens. The adhesive material is hardened, after which the platens may be removed. The resulting in-situ fastener keeps the two parts reliably fastened. The fastener is desirably flush with the surfaces of the parts. The adhesive material used may be selected to fail before the material of the fastened parts, such that the parts may be nondestructively separated when desired. Furthermore, a reliable in-situ fastener may be produced even when the through holes are not precisely aligned, and tolerance mismatch is generally less of an issue than with conventional fasteners and methods. This and other exemplary embodiments are shown and described in further detail with reference to the accompanying figures.

Figure 1:
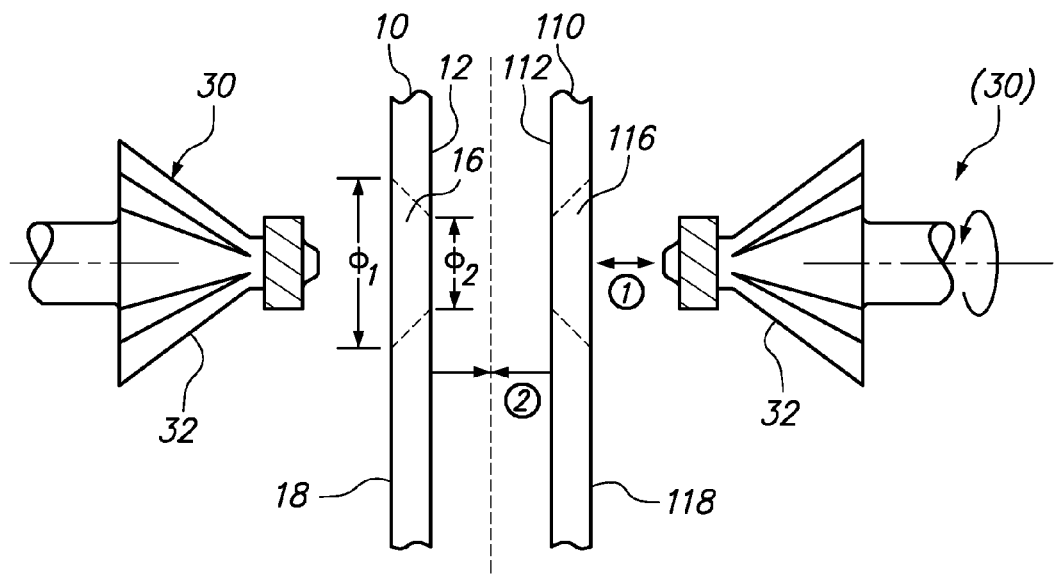
FIG. 1 is a schematic side view of a first part and a second part to be fastened according to an embodiment of the invention.

FIG. 1 is a schematic side view of a first part 10 and a second part 110 to be fastened according to an embodiment of the invention. The parts 10, 110 are to be fastened at surfaces 12, 112 (alternatively referred to as the "abutting surfaces"). A through hole forming device may be used to form holes 16, 116 along a thin-wall portion of the parts 10, 110. The thin-wall portion of each part 10, 110 may be have a uniform cross-sectional thickness, such that the abutting surface 12 is generally parallel to the opposing surface 18 and the abutting surface 112 is generally parallel to the opposing surface 118. For example, the two parts 10, 110 may be formed from sheet metal, and sheet metal typically has a relatively thin wall of uniform thickness. However, the invention does not require that two parts being joined be made of sheet metal, have a thin-wall portion, or even parallel surfaces.

An exemplary through hole forming device includes a rotatable cutting tool referred to herein as a "chamfer bit" 30. The chamfer bit 30 has a tapered cutting section 32. To form the through holes, the chamfer bit 30 may be rotated at its axis while being translated axially into engagement with each of the parts 10, 110 in the directions indicated. The tapered cutting portion 32 of the chamfer bit 30 gives the through holes 16, 116 a tapered profile optionally referred to as a "chamfer." With reference to the part 10, for example, the chamfer bit 30 may be rotated and driven axially into engagement with the opposing surface 18 and cut through to the abutting surface 12. Due to the tapered cutting section 32, the through hole 16 has an "entrance diameter" $\varnothing_1$ at the opposing surface 18 that is larger than an "exit diameter" $\varnothing_2$ at the abutting surface 12.

Figure 1A:
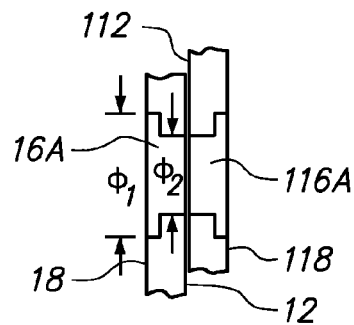
FIG. 1A is a schematic side view of the parts to be fastened, wherein the through holes have a generally stepped profile.
Figure 1B:
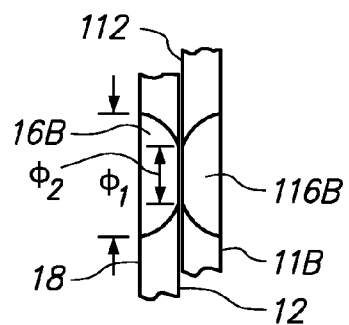
FIG. 1B is a schematic side view of the parts wherein the through holes have a curved profile.

A chamfer is just one example of a through hole profile that may be formed having a larger dimension or diameter at the opposing surface 18, 118 than at the abutting surface 12, 112 of the two parts 10, 110 to be fastened. FIGS. 1A and 1B show alternative examples of through hole profiles having a larger diameter at the opposing surface 18, 118 than at the abutting surface 12, 112. FIG. 1A is a schematic side view of the parts 10, 110 wherein the through holes 16A, 116A have a generally "stepped" profile. FIG. 1B is a schematic side view of the parts 10, 110 wherein the through holes 16B, 116B have a curved profile. The profiles of the through holes 16A, 116A and 16B, 116B each have a diameter $\varnothing_1$ at the opposing surface 18 that is larger than the diameter $\varnothing_2$ at the abutting surface 12. This relationship between diameters $\varnothing_1$ and $\varnothing_2$ ensures retention of the parts 10, 110 by the in-situ fastener formed as described below.

Alternative through hole forming devices are also within the scope of the invention. For example, a through hole forming device may include a punch used to punch through holes in parts to be fastened. A punch may reliably and economically form through holes of the desired profile, particularly in thin sheet metal. In another example, a through hole forming device may include a mold for forming the parts 10, 110 with the through holes 16, 116 already included. Also, though the parts to be fastened are described in the various embodiments as having sheet-metal construction with uniform wall thickness, even non-sheet-metal parts and parts not having a uniform wall thickness may be fastened according to one or more embodiments of the invention.

Figure 2:
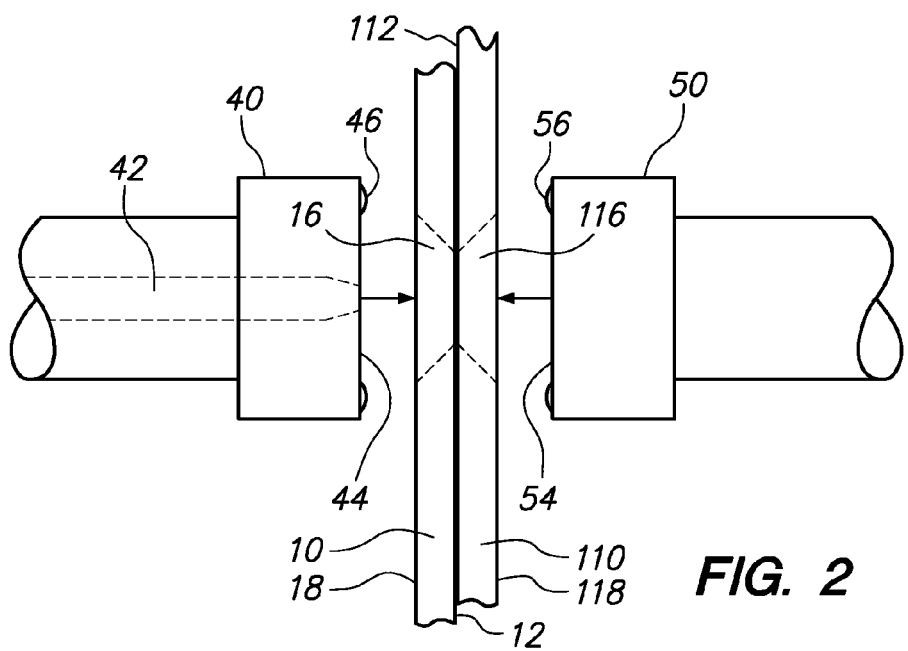
FIG. 2 is a schematic side view of the first and second parts abutting, with opposing platens positioned on either side and in general alignment with the through holes.

FIG. 2 is a schematic side view of the first and second parts 10, 110 having been brought together in an abutting relationship, with opposing platens 40, 50 positioned on either side and in general alignment with the through holes 16, 116. The through hole 16 in the part 10 is in fluid communication with the through hole 116 in the part 110. One or both of the platens 40, 50 may be movable, such as by pneumatic or mechanical actuation. For example, the platens 40, 50 may both be movable toward one another. Alternatively, one of the platens 40, 50 may be fixed while the other of the platens may be movable toward the fixed platen. The platens 40, 50 need not have the same shape, though it is desirable for both platens to be as narrow as practicable to minimize interference with other features that may be included with the parts 10, 110. The platen 40 has a flow passage 42 all the way through to an engagement surface 44 of the platen 40, while the platen 50 has no such passage through its engagement surface 54. Seal members 46, 56 are optionally included on the platens 40, 50. The sealing members may be, for example, slightly-raised circular ridges or thin elastomeric O-rings designed to sealing engage the respective opposing surfaces 18, 118 about the through holes 16, 116.

FIG. 3 is a schematic side view of the first and second parts 10, 110 with an in-situ fastener being formed in the through holes 16, 116. The parts 10, 110 are abutting, with the opposing platens 40, 50 in engagement with the parts 10 110. The optional sealing member 46 of the platen 40 is in sealing engagement with the surface 18 of the part 10, circumferentially disposed about the through hole 16, with the fluid passage 42 in fluid communication with the through hole 16. The optional sealing member 56 of the platen 50 is in sealing engagement with the surface 118 of the part 110, circumferentially disposed about the through hole 116, and closes flow to the through hole 116 at the surface 118. A flowable material injection system includes a source of flowable and hardenable material, depicted herein as an adhesive material 60, is in fluid communication with a downstream pressure source, depicted herein as a pump 65, and the pump 65 is in fluid communication with the fluid passage 42. A pressure sensor 66 is optionally included for sensing pressure, and the pressure may be adjustable.

The adhesive material 60 is a material that is both flowable and hardenable. For example, the adhesive material 60 may be a thermoplastic material or a metal alloy with a low melting point, either of which may be heated to make flowable and cooled to harden. Various examples of metal allows generally recognized as having "low" melting points are described in Specification ASTM B774-00(2005). Specific examples known in the art include Wood's metal, Lipowitz's alloy, Field's metal, Cerrobend, Cerrocast, Cerrosafe, Rose Metal, NaK, and many other commercial alloys, including solders. Thermoplastic materials also typically have melting points. A heat source 62 is optionally provided for use with adhesive materials that are made flowable by heating. The pump and/or the platen 40 may also be heated to prevent the adhesive material from solidifying inside the pump or platen. Alternatively, the adhesive material 60 may be another type of adhesive known in the art, which may be flowable in an uncured state and which may be cured to harden.

In a flowable state, the adhesive material 60 is pumped through the fluid passage 42 and into the through holes 16, 116, where the adhesive material 60 is retained between the platens 40, 50. The optional sealing members 46, 56 may have a very low profile height, so that the adhesive material 60 is generally flush with the surfaces 18, 118. If the optional sealing members 46, 56 are not included, the engagement surfaces 44, 54 of the platens 40, 50 may instead seal directly with the surfaces 18, 118.

The pump 65 or other pressure source may be used to pressurize the adhesive material injected into the through holes 16, 116, and to maintain pressure on the adhesive material 60 while the adhesive material hardens. The pressure is typically less than about thirty pounds per square inch (psi). The pressure helps fill the through holes 16, 116 with the adhesive material 60 with minimal voids. The platens 40, 50 need not engage the parts 10, 110 with a large amount of force, so long as the platens 40, 50 sufficiently retain the adhesive material in the through holes 16, 116 between the platens 40, 50. Once the adhesive material has hardened, the pressure can be released and the platens 40, 50 can be removed from the parts 10, 110. The platens optionally include or are coated with a non-stick material, such as a polytetrafluoroethylene coating 41, 51, to prevent the hardened adhesive material from sticking to the platens 40, 50.

FIG. 4 is a schematic side view of the parts 10, 110 as retained by the fastener 70. The adhesive material injected into the through hole 16, 116, as shown in FIG. 3, has hardened. The platens 40, 50 of FIG. 3 have been removed, and the parts 10, 110 remained fastened together by the fastener 70. The resulting fastener 70 has thus been formed in-situ, having been molded in place within the through holes 16, 116. FIG. 4A (inset) is a side view of the fastener 70 with the fastened parts 10, 110 hidden from view. The shape of the fastener 70 includes tapered portions 72, 74 formed against the tapered surfaces of the holes 16, 116. The tapered surfaces 72, 74 provide retention to hold the parts 10, 110 together. Thus, an effort to separate the parts 10, 110 imparts forces F1, F2 placed on the tapered surfaces 72, 74 of the fastener 70. The tapered surfaces 72, 74 resist these forces F1, F2 through interference with the tapered surfaces of the through holes 16, 116. Note that the stepped profile of the through holes 16A, 116A in FIG. 1A, the curved profile of the through holes 16B, 116B in FIG. 1B would also produce an in-situ fastener that would similarly fasten the parts 10, 110. One skilled in the art having benefit of this disclosure will appreciate that other through hole profiles having a diameter $\varnothing_1$ at the opposing surface 18 that is larger than the diameter $\varnothing_2$ at the abutting surface 12 could also be used to fasten the parts 10, 110.

It is desirable in some applications for the adhesive material to have little or no direct bonding with the parts 10, 110, so that substantially all of the retention is provided by the interference between the tapered surface 72, 74 and the tapered surfaces of the through holes 16, 116. One reason for desiring little or no direct bonding between the adhesive material and the parts is so that the parts 10, 110 may be non-destructively separated without the adhesive material or pieces thereof being stuck to the parts 10, 110 after they are separated. Non-destructive separation may be desirable, for example, to allow for optional disassembly of the parts 10 or 110, such as to replace one of the parts 10, 110 or to reconfigure an assembly that includes the parts 10, 110. A thermoplastic material or a metal alloy having a low melting point may be selected as the adhesive material. Such a material is easily made flowable by heating, while having ample strength when hardened. To separate the parts 10, 110, the parts 10, 110 may be pulled apart with sufficient force to break the fastener 70 without breaking the parts 10, 110. Furthermore, heat may be applied locally at the fastener 70 to soften the thermoplastic material or low-melting point metal alloy so that the parts 10, 110 may be more easily separated without damage to the parts 10, 110.

In other applications, it may be desirable to bond two parts permanently and with considerable bonding strength. For example, some parts such as heavy-duty chassis components may be designed for long service life with minimum serviceability. In such applications, an adhesive material capable of forming a very strong adhesive bond and/or with very high strength may be desirable. Selecting an adhesive material with high strength or strong adhesion will likely increase the retention of the parts 10, 110 by the resulting in-situ fastener. In such instances, it may also be desirable to surface-treat the tapered surfaces of the through holes 16, 116, such as by texturizing the tapered surfaces or by cleansing the tapered surfaces with a solvent, to maximize adhesion of the adhesive material with the tapered surfaces.

FIG. 5 is a schematic side view of the parts 10, 110 as fastened by a fastener 70' formed in-situ while the through holes 16, 116 were misaligned. Due to the misalignment, the centerlines of the through holes 16, 116 do not coincide. The misalignment may occur, for example, due to human error, "tolerance stack-up," or other manufacturing issues. Despite this misalignment, the through holes 16, 116 are in fluid communication when the in-situ fastener 70' is formed, and the fastener 70' is formed as a unitary member, even if not a perfectly symmetrical unitary member. Thus, the asymmetric fastener 70' still performs its intended function of fastening the parts 10, 110. Thus, the disclosed method of forming an in-situ fastener provides a reliable way of fastening the parts 10, 110 even if the parts 10, 110 are not precisely aligned.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    selecting two parts to be fastened;
    forming a through hole on each part between a first surface and an opposing second surface such that a dimension of each through hole at the first surface is larger than a dimension of the through hole at the opposing second surface;
    abutting the two parts at the respective second surfaces with the through holes in fluid communication with each other;
    injecting a flowable and hardenable material into the through holes of the two parts while preventing flow of the material out of the through holes; and
    allowing the flowable and hardenable material to harden within the through holes.

2. The method of claim 1, further comprising:
    forcibly abutting the two parts by engaging a first platen with the first surface of one of the parts and simultaneously engaging a second platen with the first surface of the other part until the flowable and hardenable material has substantially hardened.

3. The method of claim 2, further comprising:
    positioning the first platen directly over the through hole on the part engaged by the first platen; and
    flowing the flowable and hardenable material through a flow passage in the first platen and into the through holes.

4. The method of claim 3, further comprising:
applying pressure to the flowable and hardenable material while the flowable and hardenable material hardens.

5. The method of claim 4, further comprising:
applying a back pressure to the through hole on the part engaged by the second platen.

6. The method of claim 1, further comprising:
forming the through holes along sheet-metal portions of the parts.

7. The method of claim 1, wherein forming each through hole comprises tapering the through hole radially inwardly from the first surface to the second surface.

8. The method of claim 1, further comprising:
forming the through holes on sheet metal portions of the parts.

9. The method of claim 1, further comprising:
applying pressure to the flowable and hardenable material to up to thirty pounds per square inch while hardening.

10. The method of claim 1, wherein the flowable and hardenable material is selected from the group consisting of a metal alloy and a thermoplastic material, wherein the flowable and hardenable material can be made flowable by heating and is hardenable by cooling.

* * * * *